United States Patent
Kalamatianos et al.

(10) Patent No.: US 12,153,524 B2
(45) Date of Patent: Nov. 26, 2024

(54) APPARATUS, SYSTEM, AND METHOD FOR THROTTLING PREFETCHERS TO PREVENT TRAINING ON IRREGULAR MEMORY ACCESSES

(71) Applicant: Advanced Micro Devices, Inc., Santa Clara, CA (US)

(72) Inventors: John Kalamatianos, Boxborough, MA (US); Marko Scrbak, Austin, TX (US); Gabriel H. Loh, Bellevue, WA (US); Akhil Arunkumar, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/957,358

(22) Filed: Sep. 30, 2022

(65) Prior Publication Data

US 2024/0111676 A1 Apr. 4, 2024

(51) Int. Cl.
G06F 12/0862 (2016.01)

(52) U.S. Cl.
CPC .. *G06F 12/0862* (2013.01); *G06F 2212/6028* (2013.01)

(58) Field of Classification Search
CPC .............. G06F 12/0862; G06F 2212/6028
See application file for complete search history.

(56) References Cited

U.S. PATENT DOCUMENTS

| | | |
|---|---|---|
| 10,915,421 B1 * | 2/2021 | Chauhan .............. G06F 9/3836 |
| 2007/0198780 A1 | 8/2007 | Boyd |
| 2016/0054997 A1 | 2/2016 | Radhakrishnan |
| 2016/0062768 A1 * | 3/2016 | Jagannathan ......... G06F 9/3887 |
| | | 711/137 |
| 2018/0157591 A1 * | 6/2018 | Wilkerson .......... G06F 12/0862 |
| 2018/0329823 A1 | 11/2018 | Brekelbaum |
| 2020/0272474 A1 * | 8/2020 | Gabor ................ G06F 12/1027 |
| 2021/0117228 A1 | 4/2021 | Sawdon |
| 2022/0019537 A1 | 1/2022 | Roberts |

OTHER PUBLICATIONS

Power ISA v2.06 Document—www.Power.org, Jul. 23, 2010, 1341 pages.
IBM Power 3.1 ISA Manual, May 2020, 1538 pages.
Chi et al., "Runtime Association of Software Prefetch Control to Memory Access Instructions", EuroPar 2002, pp. 186-489.
Lee et al., "When prefetching works, when it doesn't and why", ACM Taco Journal, vol. 9, No. 1, Mar. 2012, 29 pages.
Ainsworth et al., "Software prefetching for indirect memory accesses", University of Cambridge, CGO 2017, pp. 305-317.

(Continued)

*Primary Examiner* — Eric Cardwell
(74) *Attorney, Agent, or Firm* — Greenberg Traurig, LLP

(57) ABSTRACT

A disclosed computing device includes at least one prefetcher and a processing device communicatively coupled to the prefetcher. The processing device is configured to detect a throttling instruction that indicates a start of a throttling region. The computing device is further configured to prevent the prefetcher from being trained on one or more memory instructions included in the throttling region in response to the throttling instruction. Various other apparatuses, systems, and methods are also disclosed.

20 Claims, 6 Drawing Sheets

(56) References Cited

OTHER PUBLICATIONS

Farhan et al., "Optimizations of unstructured aerodynamics computations for many-core architectures", IEEE Transactions on Parallel and Distributed Systems, 2018, pp. 1-16.
Hadade et al., "Software Prefetching for Unstructured Mesh Applications", ACM Transactions on Parallel Computing, vol. 7, No. 1, Mar. 2020, 23 pages.
"BIOS and Kernel Developer's Guide (BKDG) for AMD Family 16h Models 30h-3Fh Processors", URL: https://www.amd.com/system/files/TechDocs/52740_16h_Models_30h-3Fh_BKDG.pdf, Mar. 2016, 999 pages.
Vish Viswanathan, "Disclosure of H/W Prefetcher Control on some Intel Processors", URL: https://software.intel.com/en-us/articles/disclosure-of-hw-prefetcher-control-on-some-intel-processors, Technical Report, Intel, 2014, pp. 1-5.
Sinharoy et al., "IBM POWER7 Multicore Server Processor", IBM Journal of Research and Development, vol. 55, No. 3, May/Jun. 2011, 29 pages.
Heirman et al., "Near-Side Prefetch Throttling: Adaptive Prefetching for High Performance Many-Core Processors", PACT, Nov. 2018, 11 pages.
Ebrahimi et al., "Techniques for Bandwidth-Efficient Prefetching of Linked Data Structures in Hybrid Prefetching systems", HPCA 2009, 29 pages.
Pedro Diaz, "Mechanisms to Improve the Efficiency of Hardware Data Prefetchers", PhD thesis, University of Edinburgh, 2010, 145 pages.
Dahlgren et al., "Sequential Hardware Prefetching in Shared-Memory Multiprocessors", IEEE Transactions on Parallel and Distributed Systems, vol. 6, No. 7, Jul. 1995, pp. 733-746.
Hur et al., "Memory Prefetching using Adaptive Stream Detection", Micro, 2006, 12 pages.
Srinath et al., "Feedback directed Prefetching: Improving the Performance and Bandwidth Efficiency of Hardware Prefetchers", HPCA, IEEE, 2007, pp. 63-74.
Ebrahimi et al., "Coordinated Control of Multiple Prefetchers in Multi-core Systems", Micro, Dec. 2009, pp. 316-326.
Srinivasan et al., "A Static Filter for Reducing Prefetch Traffic", Technical Report, CSE-TR-400-99, University of Michigan Ann Arbor, 1999, 20 pages.
Lin et al., "Filtering Superfluous Prefetches using Density Vectors", ICCD, IEEE, 2001, pp. 124-132.
Zhuang et al., "Reducing Cache Pollution via Dynamic Data Prefetch Filtering", IEEE Transactions on Computers, vol. 56, No. 1, Jan. 2007, pp. 18-31.
International Search Report and Written Opinion issued for International Application No. PCT/US2023/075480, mailed Jan. 24, 2024; 10 pages.

\* cited by examiner

APPARATUS, SYSTEM, AND METHOD FOR THROTTLING PREFETCHERS TO PREVENT TRAINING ON IRREGULAR MEMORY ACCESSES

BACKGROUND

Prefetchers are often implemented in processing devices to speed up and/or improve the performance of computing devices, bootup processes, and/or applications. For example, a processing device can include and/or represent caches capable of storing and/or holding data needed for the execution of applications. As these caches typically have lower data capacity than main memory, the processing device is not always able to store and/or hold all the data associated with these applications solely in cache memory. Accordingly, as the processing device initiates execution of one of these applications, one or more prefetchers can fetch and/or obtain certain data from main memory in anticipation of the application needing and/or using this data. The prefetchers can then store and/or hold this data in one or more of these caches for faster access than main memory, thereby potentially improving the application's performance.

In some examples, prefetchers can be trained on memory accesses performed in connection with certain applications. Such training of the prefetchers can improve the prefetchers' ability to predict which data to fetch and/or obtain from main memory. The instant disclosure, therefore, identifies and addresses a need for additional and improved apparatuses, systems, and methods for throttling prefetchers to prevent training on irregular memory accesses.

BRIEF DESCRIPTION OF THE DRAWINGS

The accompanying drawings illustrate a number of exemplary implementations and are a part of the specification. Together with the following description, these drawings demonstrate and explain various principles of the instant disclosure.

Figure 1:
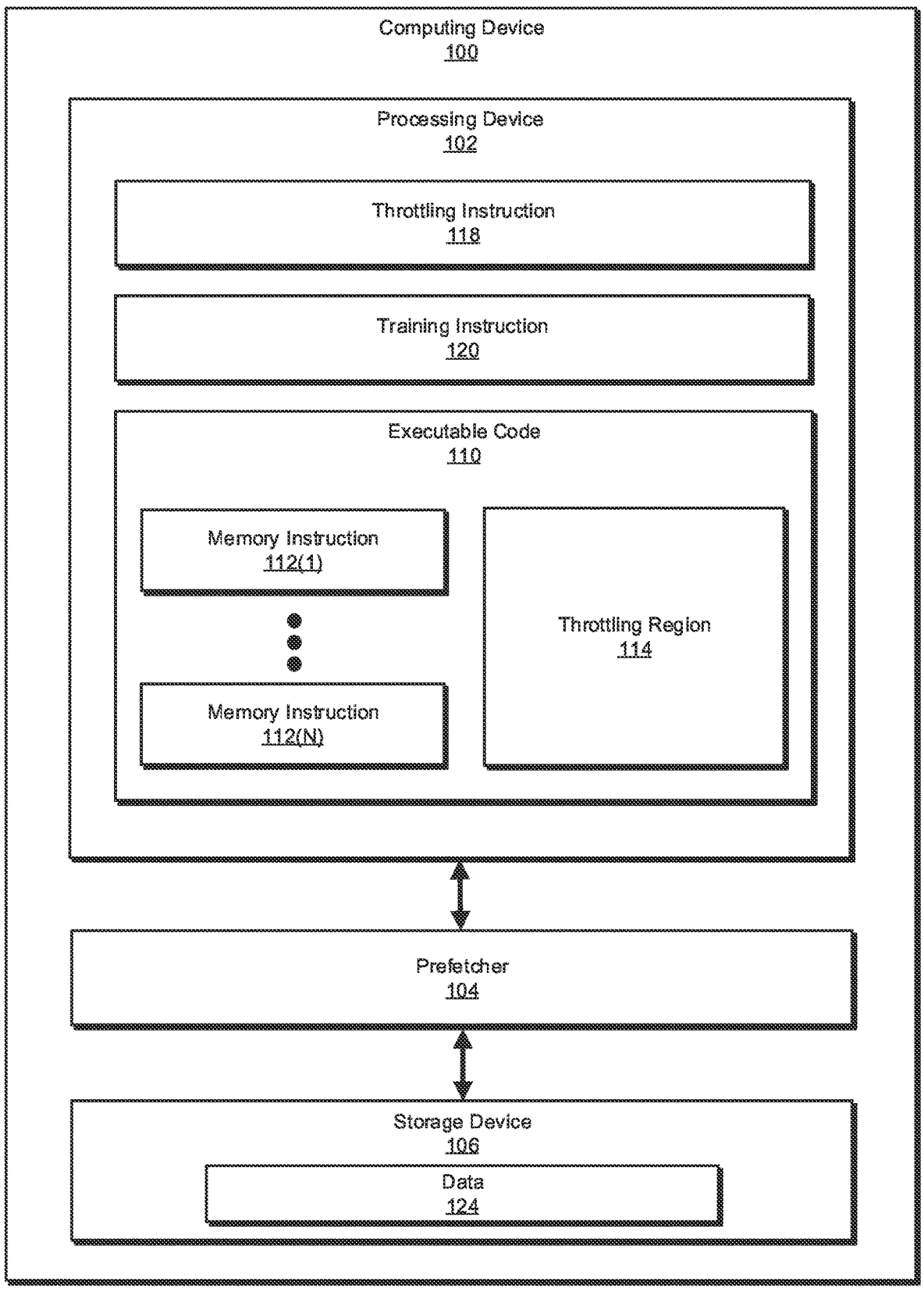
FIG. 1 is a block diagram of an exemplary computing device for throttling prefetchers to prevent training on irregular memory accesses according to one or more implementations of this disclosure.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the instant disclosure covers all modifications, equivalents, and alternatives falling within the scope of the appended claims.

DETAILED DESCRIPTION OF EXEMPLARY IMPLEMENTATIONS

The present disclosure describes various apparatuses, systems, and methods for throttling prefetchers to prevent training on irregular memory accesses. As will be explained in greater detail below, the various apparatuses, systems, and/or methods described herein can provide various benefits and/or advantages over certain traditional implementations of prefetchers. For example, the various apparatuses, systems, and/or methods described herein can improve, increase, and/or optimize the efficiency and/or performance of prefetchers that learn runtime memory access patterns and/or are trained or updated on the same. These apparatuses, systems, and/or methods can selectively regulate and/or throttle the memory traffic used to train and/or update prefetchers during runtime deployment and/or operation. By doing so, these apparatuses, systems, and/or methods prevent training and/or updating the prefetchers based on irregular memory traffic, thereby improving the prefetchers' prediction and/or fetching accuracy.

In some examples, prefetchers are associated with and/or assigned to certain caches of a processing device. In such examples, these prefetchers are responsible for fetching and/or obtaining certain data from main memory of the processing device and then storing and/or loading such data in the caches for faster access by applications running on the processing device, thereby improving the applications' speed and/or performance. In one example, these prefetchers can be trained on the memory accesses performed in connection with those applications. Unfortunately, some applications can include regions of executable code that cause the processing device to exhibit and/or implement irregular memory access patterns. Training and/or updating the prefetchers based on such irregular memory access patterns can lead to and/or result in poor and/or suboptimal performance or efficiency of the prefetchers as well as the applications relying on the data stored and/or loaded in the caches.

In some examples, to address and/or avoid such training or updating of the prefetchers, developers and/or compilers can analyze programming code, machine code, and/or executable code for evidence, signs, and/or hints of irregular memory access. In such examples, these developers and/or compilers can detect and/or identify certain portions, regions, or sections of executable code that are likely to cause a processing device to exhibit and/or perform irregular memory access patterns. In one example, these developers and/or compilers insert and/or inject certain instructions (e.g., throttling and/or training instructions) that mark and/or indicate the start and end of such irregular portions, regions, or sections into the executable code and/or its metadata. In this example, upon executing the code, the processing device can identify and/or detect the instructions that mark and/or indicate the start and end of such irregular portions, regions, or sections of the executable code.

In some examples, the processing device and/or the prefetchers can be configured to support and/or facilitate training or updating of the prefetchers as a default setting and/or feature. In one example, in response to an instruction indicating the start of a region of executable code likely to cause irregular memory accesses, the processing device disables and/or deactivates training and/or updating one or more of the prefetchers based at least in part on memory instructions (e.g., load and/or store instructions) included in that region of executable code. By doing so, the processing device can ensure that those irregular memory accesses do not negatively influence the prefetchers' prediction and/or fetching accuracy, and as a result, the prefetchers are able to train and/or update based on only regular and/or helpful memory traffic.

In some examples, the terms "training" and "updating" refer to the process of modifying a prefetcher to improve its functionality and/or performance based on certain runtime observations and/or memory access patterns. In such examples, the term "throttling" refers to a suspension and/or temporary break from the training or updating process during which the prefetcher is not modified based on such runtime observations and/or memory access patterns. Accordingly, if a prefetcher is throttled relative to certain memory traffic, the prefetcher does not train and/or update based on that memory traffic. Conversely, if a prefetcher trains and/or updates based on certain memory traffic, the prefetcher is not throttled relative to that memory traffic.

In some examples, the various apparatuses, systems, and/or methods described herein can constitute, represent, and/or implement a software-based solution for selectively training and/or updating prefetchers based on only certain memory traffic. Such a software-based solution can enable processing devices to avoid and/or prevent training and/or updating the prefetchers based on irregular memory traffic. In one example, such a software-based solution is directed to throttling the training of prefetchers based on memory traffic, as opposed to throttling the issuance of actual data prefetches. Additionally or alternatively, such a software-based solution can achieve and/or provide a variety of benefits and/or advantages, including mitigating wasted memory bandwidth, improving prefetch accuracy, depolluting target caches, and/or improving the power efficiency of processing devices.

In some examples, such a software-based solution is provided and/or supported by extensions and/or enhancements to an instruction set architecture (ISA) and/or configuration registers that control prefetcher activity and/or training. For example, a software-based solution can involve and/or constitute two new instructions, such as DPREF THROTTLE START and/or DPREF THROTTLE END. In this example, these new instructions can define the boundaries of a region of code that references memory addresses on which certain prefetchers are not to train and/or update. In certain implementations, additional instructions (e.g., memory instructions) in the ISA can be modified to include a bit or flag that indicates whether such additional instructions should be used to train and/or update the prefetchers.

In some examples, a computing device comprises at least one prefetcher and a processing device communicatively coupled to the prefetcher. In one example, the processing device is configured to detect a throttling instruction that indicates a start of a throttling region within executable code. In this example, the computing device is further configured to prevent the prefetcher from being trained on one or more memory instructions included in the throttling region in response to the throttling instruction.

In some examples, the processing device is further configured to detect a training instruction that indicates an end of the throttling region within the executable code. In response to the training instruction, the processing device enables the prefetcher to be trained on one or more additional memory instructions that are included outside the throttling region within the executable code.

In some examples, the prefetcher is configured to be trained on the additional memory instructions due at least in part to the additional memory instructions being included outside the throttling region within the executable code. Additionally or alternatively, the prefetcher is configured to perform one or more prefetches on data referenced by the memory instructions included in the throttling region and then refrain from training on the memory instructions included in the throttling region.

In some examples, the processing device comprises at least one hardware signal and is configured to program the hardware signal to a state that prevents the prefetcher from being trained on the memory instructions in response to the throttling instruction. Additionally or alternatively, the processing device comprises a core that tags, due at least in part to the state of the hardware signal, the memory instructions with metadata indicating that the memory instructions are included in the throttling region. In one example, upon tagging the memory instructions, the core dispatches the memory instructions to a pipeline that implements out-of-order execution.

In some examples, the processing device comprises a plurality of threads for multithreading and/or a plurality of hardware signals that are mapped to the plurality of threads in a 1-to-1 mapping. Additionally or alternatively, the processing device is configured to identify a thread included in the plurality of threads that corresponds to the throttling instruction. In one example, the processing device is further configured to selectively program a hardware signal included in the plurality of hardware signals to a state that prevents the prefetcher from being trained on the memory instructions due at least in part to the hardware signal being mapped to the thread corresponding to the throttling instruction.

In some examples, the prefetcher is configured to be trained on additional memory instructions included in additional executable code associated with at least one additional thread included in the plurality of threads despite the throttling instruction. Additionally or alternatively, the processing device is further configured to identify metadata associated with the memory instructions and then prevent the prefetcher from being trained on the memory instructions included in the throttling region due at least in part to the metadata indicating that the memory instructions are included in the throttling region.

In some examples, the processing device comprises a pipeline that implements out-of-order execution. Additionally or alternatively, the processing device is further configured to enable the prefetcher to be trained on one or more additional memory instructions that are included outside the throttling region within the executable code in response to detecting a training instruction that indicates an end of the throttling region. In one example, the processing device is further configured to prevent the prefetcher from being trained on the memory instructions due at least in part to the pipeline implementing the out-of-order execution and the metadata indicating that the memory instructions are included in the throttling region.

In some examples, the processing device is further configured to enable the prefetcher to be trained on one or more additional memory instructions included in additional executable code in response to a context switch in which an operating system running on the processing device switches from a thread associated with the executable code to an additional thread associated with the additional executable code. Additionally or alternatively, the processing device is further configured to prevent the prefetcher from being trained on the memory instructions included in the executable code in response to an additional context switch in which the operating system reverts from the additional thread to the thread.

In some examples, the processing device is further configured to detect, in an execution path, a deviation from the executable code to a service handler. Additionally or alternatively, the processing device is further configured to enable the prefetcher to be trained on one or more additional memory instructions associated with the service handler despite the throttling instruction due at least in part to the deviation to the service handler. In one example, the processing device is further configured to detect, in the execution path, a return from the service handler to the executable code. In this example, the processing device is further configured to prevent the prefetcher from being trained on the memory instructions included in the executable code due at least in part to the return to the executable code.

In some examples, the computing device comprises a plurality of storage devices. In such examples, the computing device comprises a plurality of prefetchers incorporated into the plurality of storage devices. In one example, the processing device is further configured to identify a prefetcher included in the plurality of prefetchers that corresponds to the throttling instruction and then selectively prevent the prefetcher that corresponds to the throttling instruction from being trained on the memory instructions that are included in the throttling region. Additionally or alternatively, at least one additional prefetcher included in the plurality of prefetchers is configured to be trained on the executable code despite the throttling instruction.

In some examples, a method for throttling prefetchers to prevent training on irregular memory accesses comprises identifying a prefetcher associated with a processing device. In one example, the method also comprises detecting, by the processing device, a throttling instruction that indicates a start of a throttling region within executable code. In this example, the method further comprises preventing, by the processing device, the prefetcher from being trained on one or more memory instructions included in the throttling region in response to the throttling instruction.

In some examples, the method also comprises detecting a training instruction that indicates an end of the throttling region within the executable code. In one example, the method additionally comprises enabling the prefetcher to be trained on one or more additional memory instructions that are included outside the throttling region within the executable code in response to the training instruction.

In some examples, a circuit comprises a storage device with at least one prefetcher and a processing device communicatively coupled to the storage device. In one example, the processing device is configured to detect a throttling instruction that indicates a start of a throttling region within executable code. The processing device is further configured to prevent the prefetcher from being trained on one or more memory instructions included in the throttling region in response to the throttling instruction.

The following will provide, with reference to FIGS. 1-5, detailed descriptions of exemplary apparatuses, systems, and/or corresponding implementations for throttling prefetchers to prevent training on irregular memory accesses. Detailed descriptions of an exemplary method for throttling prefetchers to prevent training on irregular memory accesses will be provided in connection with FIG. 6.

FIG. 1 shows an exemplary computing device 100 that facilitates throttling prefetchers to prevent training on irregular memory accesses. As illustrated in FIG. 1, exemplary computing device 100 includes and/or represents a processing device 102, a prefetcher 104, and/or a storage device 106. In some examples, processing device 102 is communicatively coupled to prefetcher 104. In one example, processing device 102 detects a throttling instruction 118 that indicates a start of a throttling region 114 within executable code 110. In response to throttling instruction 118, processing device 102 prevents prefetcher 104 from being trained on one or more memory instructions included in throttling region 114 of executable code 110.

In some examples, processing device 102 detects a training instruction 120 that indicates an end of throttling region 114 within executable code 110. In response to training instruction 120, processing device 102 enables prefetcher 104 to be trained on one or more memory instructions 112(1)-(N) included outside throttling region 114 within executable code 110. In one example, prefetcher 104 is configured and/or programmed to train or update based on memory instructions that traverse the pipeline of processing device 102 while training is active (i.e., throttling is inactive). Conversely, prefetcher 104 is configured and/or programmed to refrain from and/or avoid training or updating based on memory instructions that traverse the pipeline of processing device 102 while throttling is active (i.e., training is inactive).

In some examples, storage device 106 maintains, stores, holds, and/or buffers data 124 in connection with one or more applications installed and/or running on computing device 100. Storage device 102 can include and/or represent any type or form of volatile and/or non-volatile storage device, memory device, or medium capable of storing data and/or computer-readable instructions. In one example, storage device 106 includes and/or represents a cache communicatively coupled to prefetcher 104, and processing device 102 can also include and/or represent main memory (not necessarily illustrated in FIG. 1) communicatively coupled to prefetcher 104. Examples of storage device 106 include, without limitation, level 1 ((L1) caches, level (L2) caches, level 3 (L3) caches, level 4 (L4) caches, random access memory (RAM), dynamic RAM (DRAM), read only memory (ROM), flash memory, hard disk drives (HDDs), solid-state drives (SSDs) or devices, optical disk drives, memory devices, variations or combinations of one or more of the same, and/or any other suitable storage device.

In some examples, caches and main memory are distinguished from one another by one or more features. For example, a cache is often smaller and/or faster than main memory. Additionally or alternatively, a cache is often positioned and/or set between the CPU and main memory within a processor. Further, a cache often houses and/or stores data prefetched from main memory in anticipation of the data's use by an application.

In some examples, computing device 100 and/or processing device 102 can include and/or represent any type or form of hardware-implemented device capable of interpreting and/or executing computer-readable instructions. In one example, computing device 100 and/or processing device 102 can include and/or represent one or more semiconductor devices implemented and/or deployed as part of a computing system. For example, processing device 102 can include and/or represent a central processing unit (CPU), and computing device 100 can include and/or represent a microprocessor. In another example, processing device 102 can include and/or represent a microprocessor, and computing device 100 can include and/or represent a personal computer.

Additional examples of computing device 100 and/or processing device 102 include, without limitation, graphics processing units (GPUs), parallel accelerated processors, CPUs, microprocessors, multi-core processors, microcontrollers, field-programmable gate arrays (FPGAs) that implement softcore processors, application-specific integrated circuits (ASICs), systems on chips (SoCs), circuits (e.g., integrated circuits), client devices, laptops, tablets, desktops, servers, cellular phones, Personal Digital Assistants (PDAs), multimedia players, embedded systems, wearable devices, gaming consoles, routers, switches, hubs, modems, bridges, repeaters, gateways, multiplexers, network adapters, network interfaces, portions of one or more of the same, variations or combinations of one or more of the same, and/or any other suitable computing and/or processing device.

Computing device 100 and/or processing device 102 can implement and/or be configured with any of a variety of different architectures and/or microarchitectures. For example, computing device 100 and/or processing device 102 can implement and/or be configured as a reduced instruction set computer (RISC) architecture. In another example, computing device 100 and/or processing device 102 can implement and/or be configured as a complex instruction set computer (CISC) architecture. Additional examples of such architectures and/or microarchitectures include, without limitation, parallel acceleration architectures, 16-bit computer architectures, 32-bit computer architectures, 64-bit computer architectures, x86 computer architectures, advanced RISC machine (ARM) architectures, microprocessor without interlocked pipelined stages (MIPS) architectures, scalable processor architectures (SPARCs), load-store architectures, portions of one or more of the same, combinations or variations of one or more of the same, and/or any other suitable architectures or microarchitectures.

In some examples, computing device 100 can include and/or incorporate one or more additional components that are not explicitly represented and/or illustrated in FIG. 1. Examples of such additional components include, without limitation, processor cores, processor pipelines, caches, prefetchers, main memory, circuitry, transistors, resistors, capacitors, diodes, connections, traces, buses, semiconductor (e.g., silicon) devices and/or structures, circuit boards, housings, combinations or variations of one or more of the same, and/or any other suitable components that enable computing device 100 to throttle prefetchers to prevent training on irregular memory traffic. Additionally or alternatively, computing device 100 can exclude and/or omit one or more of the components, devices, and/or features that are illustrated and/or labelled in FIG. 1.

In some examples, prefetcher 104 can include and/or represent a hardware device, component, and/or feature capable of fetching and/or obtaining data from main memory and then storing and/or loading the data in cache memory. In one example, prefetcher 104 can learn memory access patterns exhibited by traffic coming from the core of processing device 102. In this example, prefetcher 104 can train and/or be trained on those memory access patterns to improve the accuracy of its data predictions or prefetching by avoiding data mispredictions, cache misses, and/or cache pollution. Although FIG. 1 illustrates a single prefetcher and a single storage device, alternative implementations (e.g., processing device 102 in FIG. 5) can include and/or represent various prefetchers associated with and/or communicatively coupled to various caches. For example, processing device 102 can include and/or incorporate prefetchers in an L1 cache, an L2 cache, an L3 cache, an L4 cache, a DRAM controller, and/or a processor core.

In some examples, although illustrated and/or represented as separate and/or distinct features or components of computing device 100, one or more of processing device 102, prefetcher 104, and/or storage device 106 can alternatively constitute and/or represent portions or areas of a single feature, component, device, and/or unit. For example, processing device 102 can include and/or represent a microprocessor with a CPU, storage device 106 (e.g., cache memory), and/or prefetcher 104.

In some examples, throttling instruction 118 and/or training instruction 120 can each include and/or represent any type or form of computer-readable instruction and/or command. In one example, throttling instruction 118 and/or training instruction 120 occupy and/or are present in the instruction window of processing device 102. However, in this example, neither throttling instruction 118 nor training instruction 120 occupies and/or consumes bandwidth in the scheduler queue of processing device 102. As a result, throttling instruction 118 and/or training instruction 120 can avoid consuming and/or wasting any execution bandwidth of processing device 102.

In certain implementations, throttling instruction 118 and/or training instruction 120 can cause the CPU of processing device 102 to change and/or modify a bit and/or flag that controls throttling the training or updating of prefetcher 104. In such implementations, once dispatched and used to change the bit and/or flag, throttling instruction 118 and/or training instruction 120 can each convert and/or transform into a no-op to avoid consuming and/or wasting any execution bandwidth of processing device 102. In one example, throttling instruction 118 marks and/or references the start of throttling region 114 for processing device 102. In this example, training instruction 120 marks and/or references the end of throttling region 114 for processing device 102. Each throttling region of executable code can be defined and/or determined by complementary instructions indicating whether to throttle or train prefetcher 104. In other words, each throttling region of executable code can include and/or represent a single point of entry and a single point of exit.

In some examples, executable code 110 can include and/or represent any type or form of computer-readable instructions and/or commands. In one example, executable code 110 includes and/or represents throttling region 114 comprised of one or more memory instructions, micro-operations, and/or requests capable of causing processing device 102 to load, store, move, and/or access data in storage device 106, cache memory, and/or main memory. In this example, throttling region 114 of executable code 110 constitutes and/or represents memory instructions, micro-operations, and/or requests that exhibit irregular memory access patterns on which prefetcher 104 is to avoid training and/or updating.

In some examples, executable code 110 also includes and/or represents memory instructions 112(1)-(N) outside throttling region 114. In one example, memory instructions 112(1)-(N) exhibit regular memory access patterns on which prefetcher 104 is to be trained and/or updated. Accordingly, both throttling region 114 and memory instructions 112(1)-(N) include and/or represent subsets or portions of executable code 110. Examples of memory instructions include, without limitation, load instructions, store instructions, move instructions, micro-operations, variations and/or combinations of one or more of the same, and/or any other data movement instructions that facilitate accessing and/or otherwise manipulating data in one way or another.

In some examples, prefetcher 104 continues prefetching data from main memory and/or storing that data in cache memory while processing device 102 executes throttling region 114 of executable code 110. Put differently, in such examples, prefetcher 104 continues performing prefetching data from main memory and/or storing that data in cache memory even though the corresponding bit and/or flag indicates that training of prefetcher 104 is throttled at the moment. Additionally or alternatively, prefetcher 104 performs prefetches on data while throttling is active and processing device 102 executes one or more memory instructions included in throttling region 114. In one example, this continued prefetching occurs due at least in part to the throttling being applied only to the training and/or updating of prefetcher 104, as opposed to the performance, prefetching, and/or operation of prefetcher 104.

In some examples, the bit and/or flag that controls throttling the training or updating of prefetcher 104 is tied and/or associated with a hardware signal in processing device 102. In such examples, in response to a change and/or modification to this bit and/or flag, processing device 102 sets or resets the state of the hardware signal. In one example, the hardware signal is communicatively coupled to prefetcher 104. In this example, processing device 102 can program the hardware signal to a state (e.g., a digital 0 or 1) that prevents prefetcher 104 from being trained on throttling region 114 in response to throttling instruction 118. Additionally or alternatively, processing device 102 can program the hardware signal to a different state that enables prefetcher 104 to be trained on memory instructions 112(1)-(N) outside throttling region 114 in response to training instruction 120.

Figure 2:
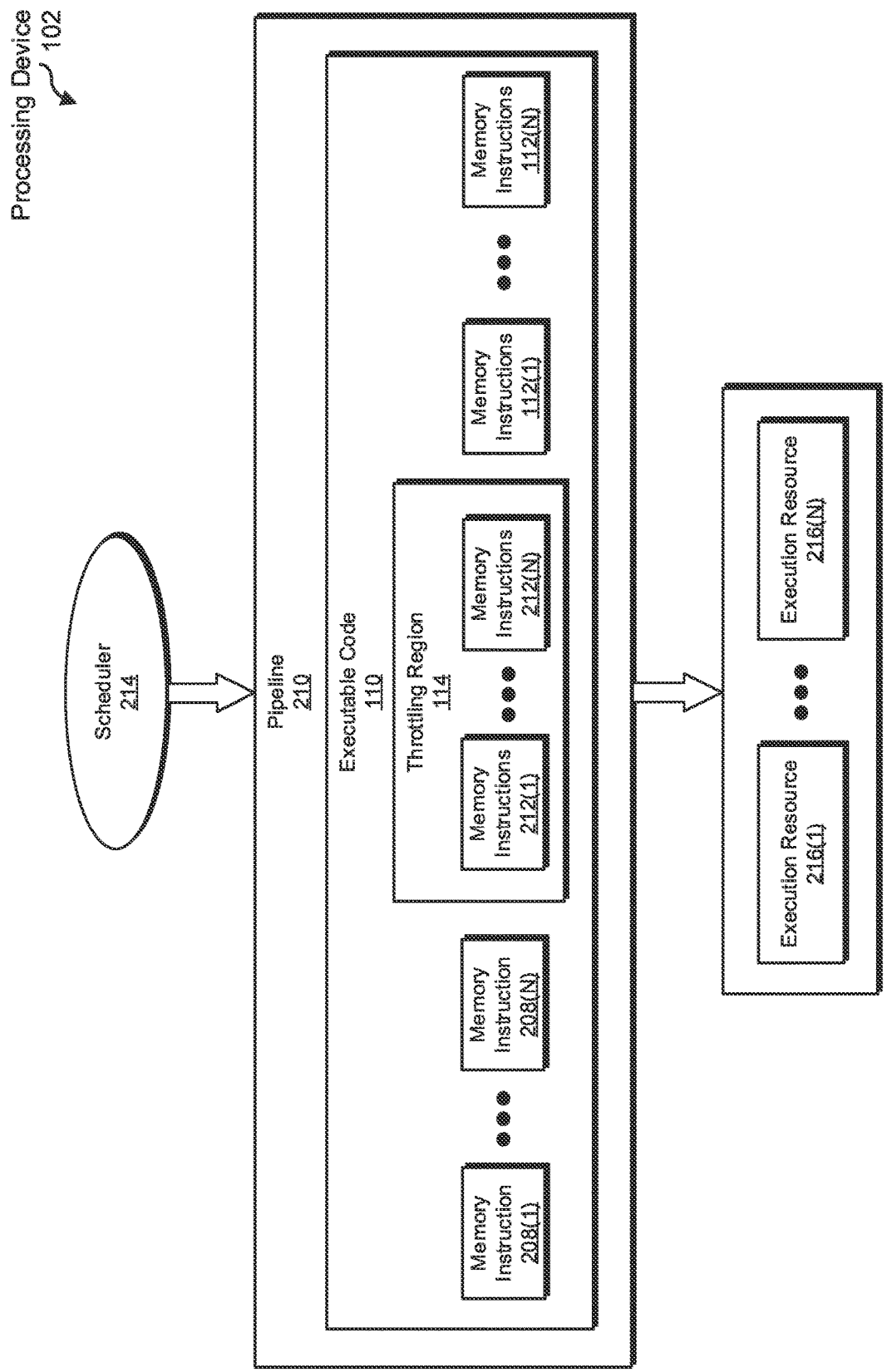
FIG. 2 is a block diagram of an exemplary processing device that facilitates throttling prefetchers to prevent training on irregular memory accesses according to one or more implementations of this disclosure.

FIG. 2 shows an exemplary implementation of processing device 102 that facilitates throttling prefetchers to prevent training on irregular memory accesses. As illustrated in FIG. 2, exemplary processing device 102 can include and/or represent a scheduler 214, a pipeline 210, and/or one or more execution resources 216(1)-(N). In some examples, scheduler 214 maintains, stores, and/or buffers micro-operations and/or memory instructions destined for execution resources 216(1)-(N). Additionally or alternatively, scheduler 214 and/or a corresponding picker can select and/or pick certain micro-operations and/or memory instructions to be issued and/or sent to execution resources 216(1)-(N) for execution via pipeline 210. In certain implementations, although execution resources 216(1)-(N) are illustrated as separate and/or distinct components in FIGS. 2 and 3, execution resources 216(1)-(N) can collectively constitute and/or represent a single execution resource. Accordingly, the micro-operations and/or memory instructions can all be executed by a single execution resource, or the micro-operations and/or memory instructions can be executed by multiple execution resources.

In some examples, scheduler 214 can feed and/or issue some or all of executable code 110 to pipeline 210 for eventual execution by execution resources 216(1)-(N). In a specific example, pipeline 210 holds and/or carries memory instructions 208(1)-(N) and 112(1)-(N) as well as throttling region 114. As illustrated in FIG. 2, throttling region 114 can include and/or represent memory instructions 212(1)-(N) on which prefetcher 104 should not be trained. In this example, upon the initiation and/or launch of executable code 110, prefetcher 104 can be configured and/or programmed (e.g., by default) to train on the initial portion of executable code 110, as opposed to being throttled from training on the initial portion of executable code 110.

Accordingly, prefetcher 104 can learn and/or train on memory access patterns exhibited by memory instructions 208(1)-(N) upon execution of the initial portion of executable code 110. For example, processing device 102 sends and/or forwards memory addresses associated with and/or referenced by memory instructions 208(1)-(N) to prefetcher 104 to learn and/or be used for training. In this example, prefetcher 104 can then train and/or update based at least in part on one or more memory access patterns exhibited by memory instructions 208(1)-(N) in view of those memory addresses.

In some examples, processing device 102 detects throttling instruction 118 during the execution of executable code 110. In one example, processing device 102 determines that throttling instruction 118 indicates and/or references the start of throttling region 114 within executable code 110 to facilitate throttling prefetcher 104 with respect to memory instructions 212(1)-(N). In this example, processing device 102 directs and/or causes prefetcher 104 to ignore and/or disregard memory instructions 212(1)-(N) of throttling region 114 for training purposes. For example, processing device 102 refrains from sending and/or forwarding memory addresses associated with and/or referenced by memory instructions 212(1)-(N) to prefetcher 104 to facilitate throttling. In this example, prefetcher 104 can then refrain from training and/or updating based at least in part on any memory access patterns and/or anomalies exhibited by memory instructions 212(1)-(N).

In some examples, processing device 102 detects training instruction 120 during the execution of executable code 110. In one example, processing device 102 determines that training instruction 120 indicates and/or references the end of throttling region 114 within executable code 110 to facilitate training prefetcher 104 with respect to memory instructions 112(1)-(N) after the completion of throttling region 114. In this example, processing device 102 directs and/or causes prefetcher 104 to consider and/or analyze memory instructions 112(1)-(N) outside throttling region 114 for training purposes. For example, processing device 102 sends and/or forwards memory addresses associated with and/or referenced by memory instructions 112(1)-(N) to prefetcher 104 to learn and/or be used for training. In this example, prefetcher 104 can then train and/or update based at least in part on one or more memory access patterns exhibited by memory instructions 208(1)-(N) in view of those memory addresses.

In some examples, scheduler 214 includes and/or represents any type or form of queue and/or buffer implemented and/or configured in computing device 100. In one example, scheduler 214 includes and/or represents a data structure and/or an abstract data type. In another example, scheduler 214 includes and/or represents a feature of a CPU that maintains, presents, and/or provides micro-operations and/or memory instructions to be picked for feeding and/or issuance to execution resources 216(1)-(N) via pipeline 210. Additionally or alternatively, scheduler 214 includes and/or represents hardware, software, and/or firmware implemented as part of processing device 102.

In some examples, scheduler 214 includes and/or represents a picker responsible for picking and/or selecting groups of micro-operations and/or memory instructions for execution by execution resources 216(1)-(N). In one example, the picker can include and/or represent hardware, software, and/or firmware implemented as part of processing device 102.

In some examples, execution resources 216(1)-(N) include and/or represent any type or form of digital circuit that performs micro-operations on numbers, data, and/or values. In one example, execution resources 216(1)-(N) can include and/or represent one or more binary multipliers and/or floating-point units (FPUs) capable of executing complex micro-operations and/or memory instructions. Additionally or alternatively, execution resources 216(1)-(N) can include and/or represent one or more ALUs capable of executing simple micro-operations and/or memory instructions.

Figure 3:
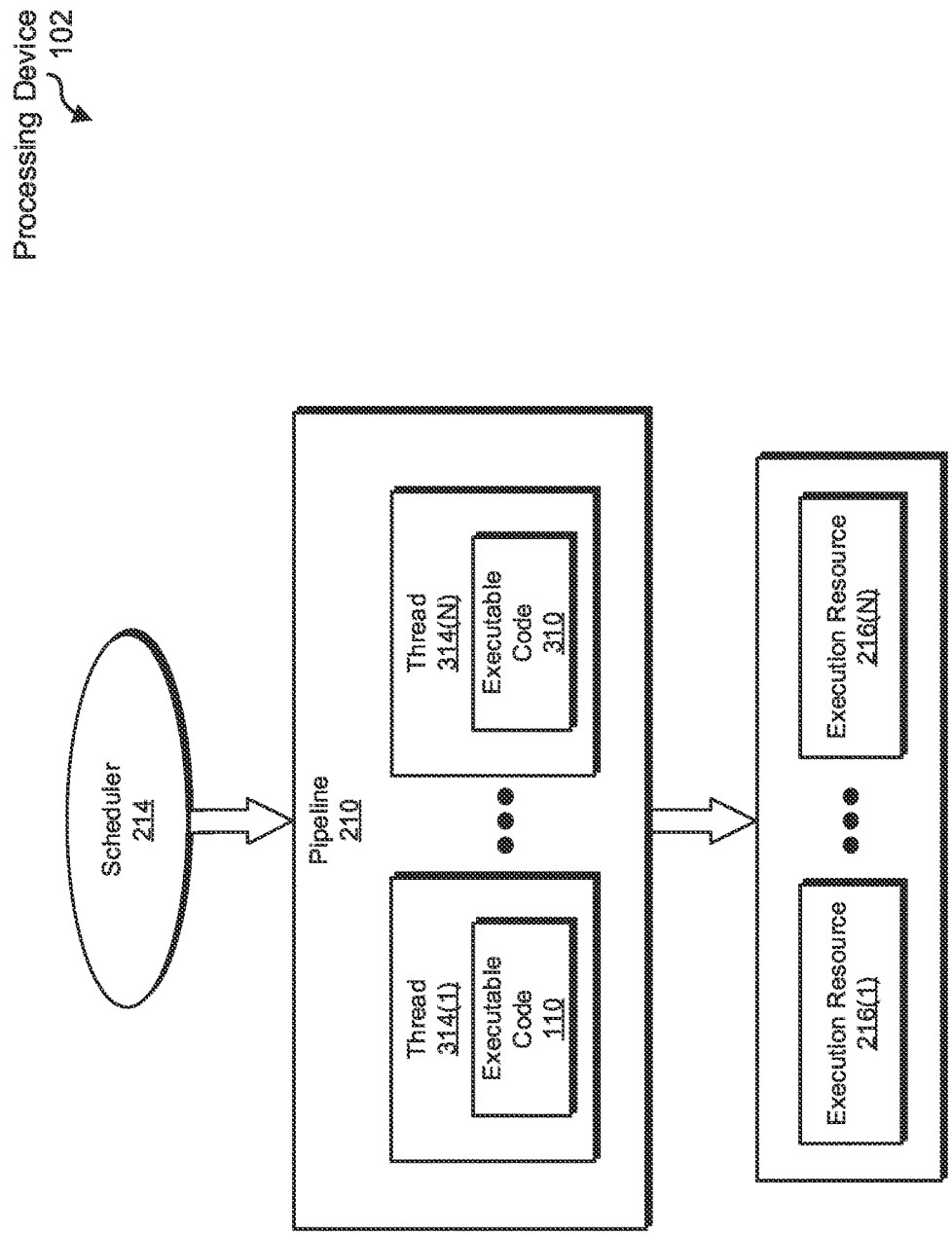
FIG. 3 is a block diagram of an exemplary processing device that facilitates throttling prefetchers to prevent training on irregular memory accesses according to one or more implementations of this disclosure.

FIG. 3 shows an exemplary implementation of processing device 102 that facilitates throttling prefetchers to prevent training on irregular memory accesses. As illustrated in FIG. 3, exemplary processing device 102 can include and/or represent scheduler 214, pipeline 210, and/or execution resources 216(1)-(N). In some examples, processing device 102 implements and/or provides multithreading such that its CPU is able to execute and/or perform multiple threads of execution simultaneously. For example, processing device 102 can implement, execute, and/or perform threads 314(1)-(N) concurrently via pipeline 210 and/or execution resources 216(1)-(N). In one example, thread 314(1) includes and/or contains executable code 110, and thread 314(N) includes and/or contains executable code 310. Additionally or alternatively, executable code 110 can be associated with and/or mapped to thread 314(1), and executable code 310 can be associated with and/or mapped to thread 314(N).

In some examples, processing device 102 is configured and/or programmed to selectively implement throttling and/or training on threads 314(1)-(N) independent of one another. For example, processing device 102 can prevent prefetcher 104 from training on throttling region 114 of executable code 110 associated with thread 314(1) while simultaneously enabling prefetcher 104 to train on portions of executable code 310 associated with thread 314(N). In this example, processing device 102 can perform multithreading on executable codes 110 and 310 via threads 314(1) and 314(N), respectively. As processing device 102 performs such multithreading, prefetcher 104 can train and/or update on executable code 310 while being unable to train and/or update on throttling region 114 of executable code 110.

In some examples, processing device 102 includes and/or represents multiple hardware signals that are mapped to threads 314(1)-(N) in a 1-to-1 mapping. For example, if processing device 102 is able to perform multithreading on three different threads simultaneously, processing device 102 is equipped with three different hardware signals that are mapped to those three threads. In one example, these three hardware signals each communicatively couple processing device 102 (e.g., one or more processor cores) to prefetcher 104. In this example, these three hardware signals are mapped to the three threads such that processing device 102 is able to communicate throttling and/or training commands to prefetcher 104 with respect to each of the individual three threads.

In some examples, processing device 102 identifies a specific thread that corresponds to throttling instruction 118. In such examples, processing device 102 selectively modifies and/or programs the hardware signal mapped to that specific thread to a state (e.g., a digital 0 or 1) that prevents prefetcher 104 from being trained on throttling region 114 of executable code 110 due at least in part to the hardware signal being mapped to that specific thread. For example, processing device 102 determines that throttling instruction 118 corresponds to thread 314(1) based at least in part on the contents of throttling instruction 118 and/or its metadata. In response to this determination, processing device 102 selectively sets and/or resets the hardware signal mapped to thread 314(1) to prevent prefetcher 104 from being trained on throttling region 114 of executable code 110 due at least in part to the state of that hardware signal. In one example, processing device 102 prevents prefetcher 104 from being trained on throttling region 114 by shutting down and/or turning off the hardware responsible for sending memory addresses to prefetcher 104 for training and/or updating.

However, despite the state of that hardware signal and/or throttling instruction 118, prefetcher 104 can still be trained on memory instructions included in executable code 310 associated with thread 314(N). For example, processing device 102 can enable prefetcher 104 to be trained on the memory instructions included in executable code 310 in response to a context switch. In this example, the context switch includes and/or represents an instance and/or event in which an operating system running on processing device 102 switches from thread 314(1) to thread 314(N) as part of the multithreading feature.

In certain implementations, processing device 102 is configured and/or programmed to change and/or modify the hardware signal to prefetcher 104 to ensure that prefetcher 104 trains (e.g., by default) based on executable code and/or memory traffic associated with the new thread. Additionally or alternatively, processing device 102 is configured and/or programmed to prevent prefetcher 104 from being trained on memory instructions 212(1)-(N) included in executable code 110 in response to an additional context switch. In one example, the additional context switch includes and/or represents an instance and/or event in which the operating system reverts back from thread 314(N) to thread 314(1) in the middle of throttling region 114. Accordingly, processing device 102 can ensure that the state of throttling or training experienced by prefetcher 104 prior to the context switch is reapplied and/or restored upon completion of the additional context switch.

Figure 4:
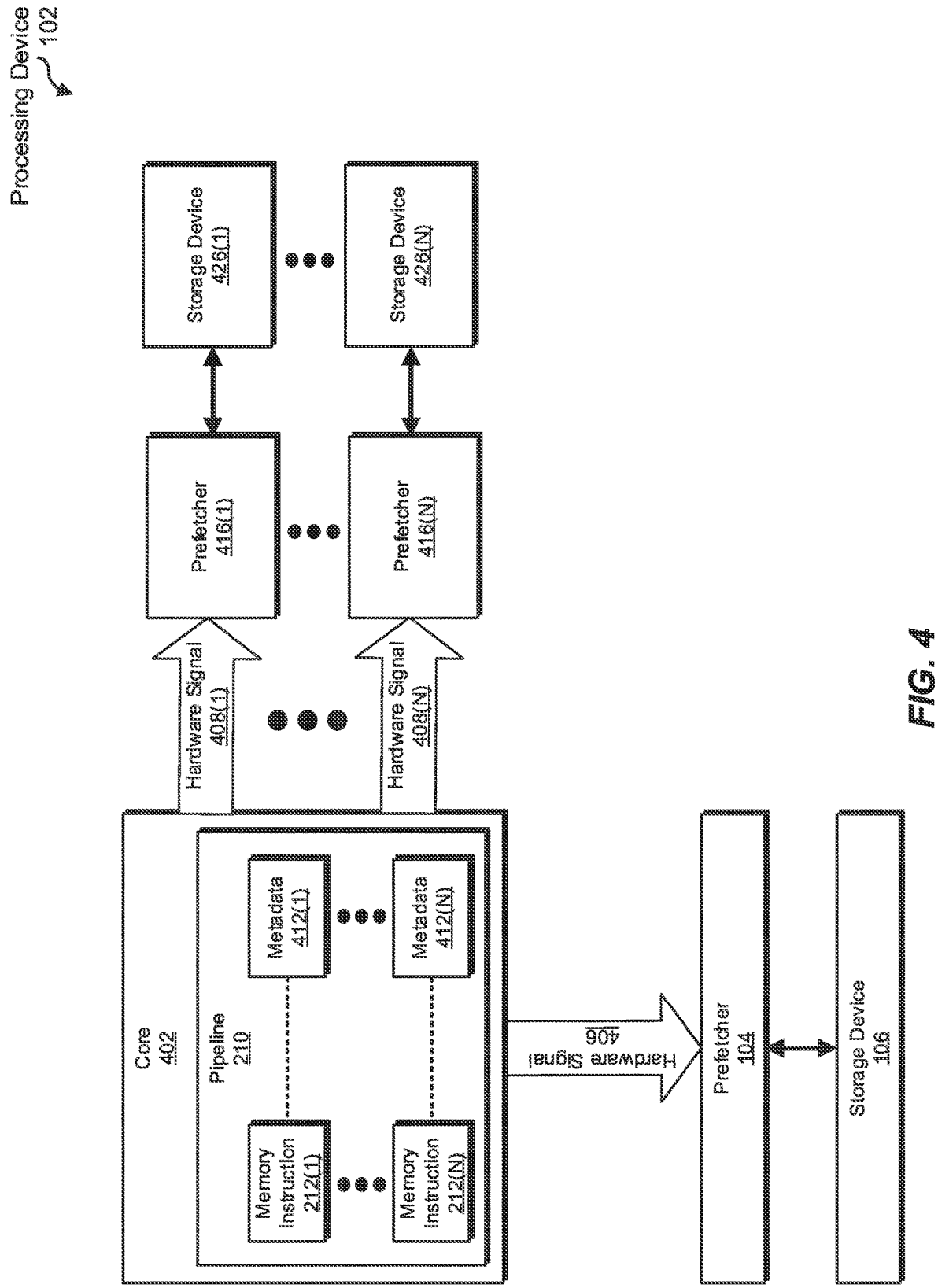
FIG. 4 is a block diagram of an exemplary processing device that facilitates throttling prefetchers to prevent training on irregular memory accesses according to one or more implementations of this disclosure.

FIG. 4 shows an exemplary implementation of processing device 102 that facilitates throttling prefetchers to prevent training on irregular memory accesses. As illustrated in FIG. 4, exemplary processing device 102 can include and/or represent a core 402 with pipeline 210 as well as prefetchers 104 and 416(1)-(N) and/or storage devices 106 and 426(1)-(N). In some examples, core 402 of processing device 102 is communicatively coupled to prefetcher 104 and 416(1)-(N) via hardware signals 406 and 408(1)-(N), respectively. In such examples, prefetchers 104 and 416(1)-(N) are responsible for prefetching data for storage devices 106 and 426(1)-(N), respectively. In certain implementations, although storage devices 106 and 426(1)-(N) are illustrated as separate and/or distinct components in FIG. 4, storage devices 106 and 426(1)-(N) can collectively constitute and/or represent a single storage device. Accordingly, prefetchers 416(1)-(N) can all prefetch from a single storage device, or prefetchers 416(1)-(N) can prefetch from multiple storage devices.

In some examples, the number of prefetchers implemented in processing device 102 can vary from the number of execution resources implemented in processing device 102. For example, pipeline 210 can include and/or represent a total of N execution resources that train a total of M prefetchers. In one example, training requests made by the N execution resources can be queued up in a total of M queues that feed the prefetchers.

In some examples, pipeline 210 includes and/or carries memory instructions 212(1)-(N) along with corresponding metadata 412(1)-(N), respectively. In such examples, pipeline 210 can also include and/or carry additional memory instructions (e.g., memory instructions 112(1)-(N)) along with corresponding metadata. In one example, pipeline 210 can feed and/or deliver such memory instructions to execution resources 216(1)-(N) for execution.

In some examples, core 402 of processing device 102 tags memory instructions with metadata indicating whether the memory instructions are included in the throttling region of executable code. For example, core 402 tags and/or marks memory instructions 212(1)-(N) with metadata 412(1)-(N), respectively, indicating that memory instructions 212(1)-(N) are included in throttling region 114 of executable code 110. Additionally or alternatively, core 402 tags and/or marks memory instructions 112(1)-(N) with metadata indicating that memory instructions 112(1)-(N) are included outside throttling region 114.

In some examples, core 402 of processing device 102 dispatches in program order the memory instructions to pipeline 210, which implements out-of-order execution. In such examples, core 402 of processing device 102 also tags the memory instructions with the metadata in the same program order. In one example, such tags and/or metadata can enable one or more features of processing device 102 to determine whether the corresponding memory instructions constitute and/or represent part of a throttling region of executable code irrespective of any hardware signals. As a result, even after the corresponding hardware signal has been modified by training instruction 120, such features of processing device 102 are able to identify memory instructions included in a throttling region despite the out-of-order execution of pipeline 210 and the corresponding hardware signal indicating that the prefetcher is training (i.e., not throttling).

In some examples, the out-of-order execution of pipeline 210 causes and/or enables processing device 102 to execute instructions in an order governed by one or more features other than the age of the instructions (e.g., availability of input data and/or satisfaction of contingencies). For example, core 402 dispatches in program order memory instructions 212(1)-(N) with metadata 412(1)-(N), respectively, to pipeline 210 for eventual execution by execution resources 216(1)-(N). Additionally or alternatively, core 402 dispatches in program order memory instructions 112(1)-(N) with metadata to pipeline 210 for execution by execution resources 216(1)-(N).

In some examples, one or more features of processing device 102 identify and/or analyze metadata 412(1)-(N) associated with memory instructions 212(1)-(N). In such examples, these features of processing device 102 prevent one or more of prefetchers 104 and 416(1)-(N) from being trained and/or updated on memory instructions 212(1)-(N) due at least in part to metadata 412(1)-(N) indicating that memory instructions 212(1)-(N) are included in throttling region 114 and/or pipeline 210 implementing the out-of-order execution. In additional examples, these features of processing device 102 identify and/or analyze metadata associated with memory instructions 112(1)-(N). In such examples, these features of processing device 102 enable one or more of prefetchers 104 and 416(1)-(N) to be trained and/or updated on memory instructions 112(1)-(N) due at least in part to the metadata indicating that memory instructions 112(1)-(N) are included outside throttling region 114 and/or training instruction 120 indicating the end of throttling region 114.

In some examples, processing device 102 identifies one of prefetchers 104 and 416(1)-(N) that corresponds to throttling instruction 118. For example, throttling instruction 118 can include and/or contain data and/or information that identifies or specifies one of prefetchers 416(1)-(N). In this example, processing device 102 selectively prevents prefetcher 416(1) from being trained on memory instructions 212(1)-(N) included in throttling region 114 of executable code 110 in response to throttling instruction 118. Additionally or alternatively, throttling instruction 118 may or may not implicate any other prefetchers. If throttling instruction 118 does not implicate any other prefetchers, processing device 102 enables and/or allows prefetcher 104 and/or prefetcher 416(N) to continue in the state (whether training or throttling) applied at the moment throttling instruction 118 is detected. Accordingly, prefetcher 104 and/or prefetcher 416(N) can be configured to train and/or update based at least in part on executable code 110 and/or additional executable code while prefetcher 416(1) is throttled despite throttling instruction 118.

In some examples, processing device 102 can implement and/or incorporate various types of data prefetchers at any level of the memory hierarchy. In such example, each type of prefetcher can target different forms of memory traffic (e.g., stride, stream, spatial or temporal prefetchers, pointer accesses, etc.). In one example, the training and/or throttling instructions can target different types of prefetchers to selectively throttle only prefetchers of a certain type in connection with an application. Additionally or alternatively, the training and/or throttling instructions can target different types of memory traffic to selectively throttle prefetchers on memory traffic of a certain type in connection with an application.

In some examples, processing device 102 can achieve throttling and/or training a prefetcher via machine status registers. For example, processing device 102 can invoke system calls via Write to Model Specific Register (WRMSR) and/or Read from Model Specific Register (RDMSR) commands at the user and/or application level. By doing so, processing device 102 can enable and/or disable different types of data prefetchers within an application. Accordingly, processing device 102 can throttle different prefetchers by enabling and/or disabling their training features via machine status registers. In one example, this approach to throttling can be achieved without making modifications to the ISA.

Figure 5:
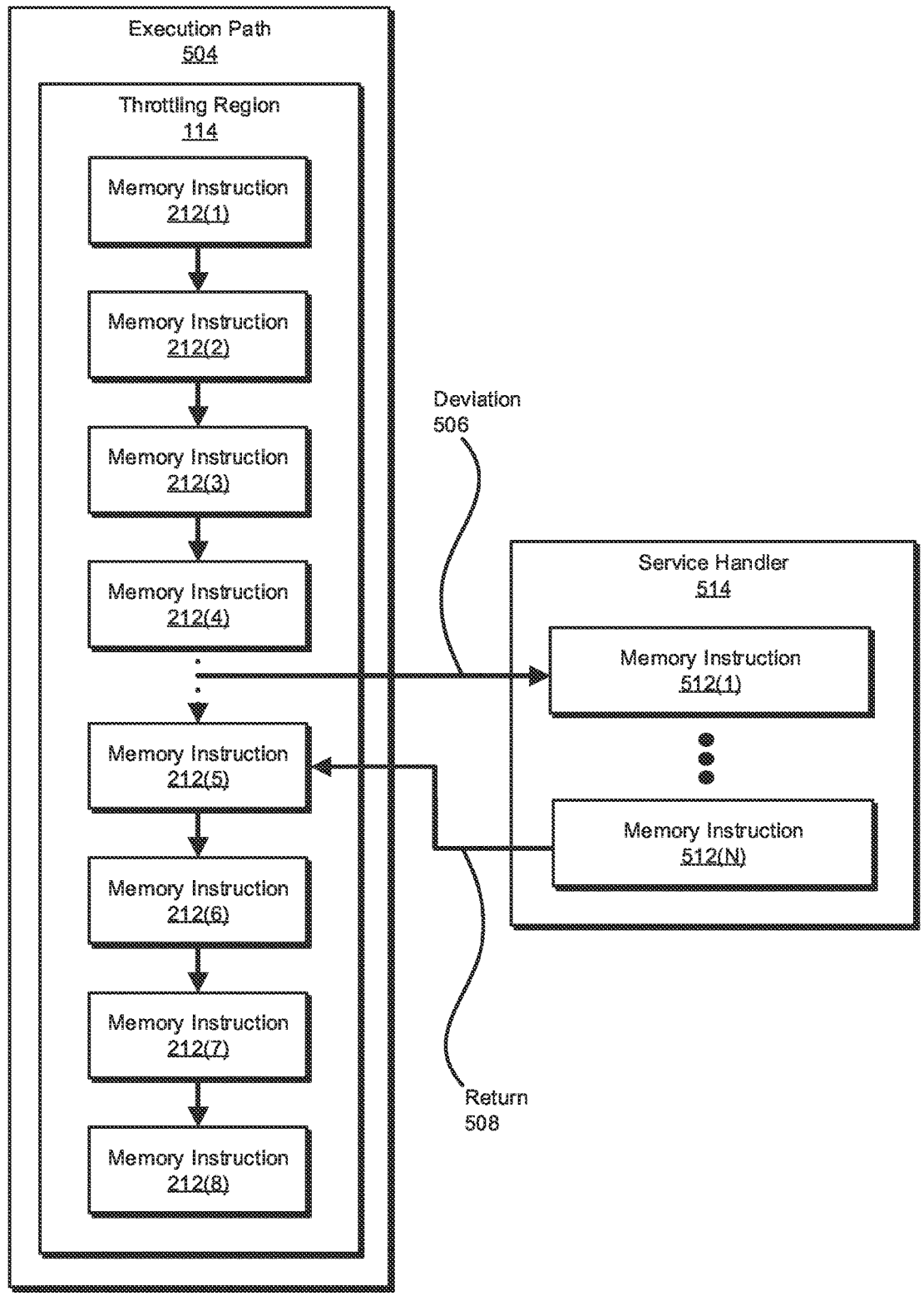
FIG. 5 is a block diagram of an exemplary implementation of certain features that facilitate throttling prefetchers to prevent training on irregular memory accesses according to one or more applications of this disclosure.

FIG. 5 shows an exemplary implementation 500 of an execution path 504 and/or a service handler 514. In some examples, processing device 102 begins executing and/or implementing execution path 504, which includes and/or represents throttling region 114 of execution code 110. In such examples, execution path 504 constitutes and/or defines a sequence of instructions to be executed and/or performed by processing device 102. In one example, throttling region 114 of execution code 110 includes and/or represents memory instructions 212(1), 212(2), 212(3), 212(4), 212(5), 212(6), 212(7), and 212(8).

In some examples, processing device 102 detects, in execution path 504, a deviation 506 from throttling region 114 and/or executable code 110 to service handler 514. For example, upon executing memory instruction 212(4) of throttling region 114, processing device 102 executes memory instruction 512(1) of service handler 514. In this example, processing device 102 enables prefetcher 104 to be trained on memory instructions 512(1)-(N) associated with service handler 514 despite throttling instruction 118 due at least in part to deviation 506 to service handler 514.

In some examples, service handler 514 includes and/or represents an interrupt service handler and/or routine. In other examples, service handler 514 includes and/or represents a trap service handler and/or routine.

In some examples, processing device 102 detects, in execution path 504, a return 508 from service handler 514 to throttling region 114 and/or executable code 110. In one example, return 508 to throttling region 114 and/or executable code 110 occurs between memory instructions 212(4) and 212(5) of throttling region 114. As a result, upon executing memory instruction 512(N) of service handler 514, processing device 102 executes memory instruction 212(5) of throttling region 114. In this example, processing device 102 prevents prefetcher 104 from being trained on memory instructions 212(5)-(8) included in throttling region 114 of executable code 110 due at least in part to return 508 to throttling region 114.

Accordingly, processing device 102 can track, follow, and/or monitor the state of the prefetchers (e.g., whether training or throttling at any given moment) across different code paths, branches, and/or threads. This is accomplished by using the throttling signal of the instructions that are re-fetched after a pipeline flush event. By doing so, processing device 102 can ensure that, if a prefetcher is throttling at the time of a code path deviation, the state of the prefetcher reverts to throttling once the code path returns to the deviation point.

Figure 6:
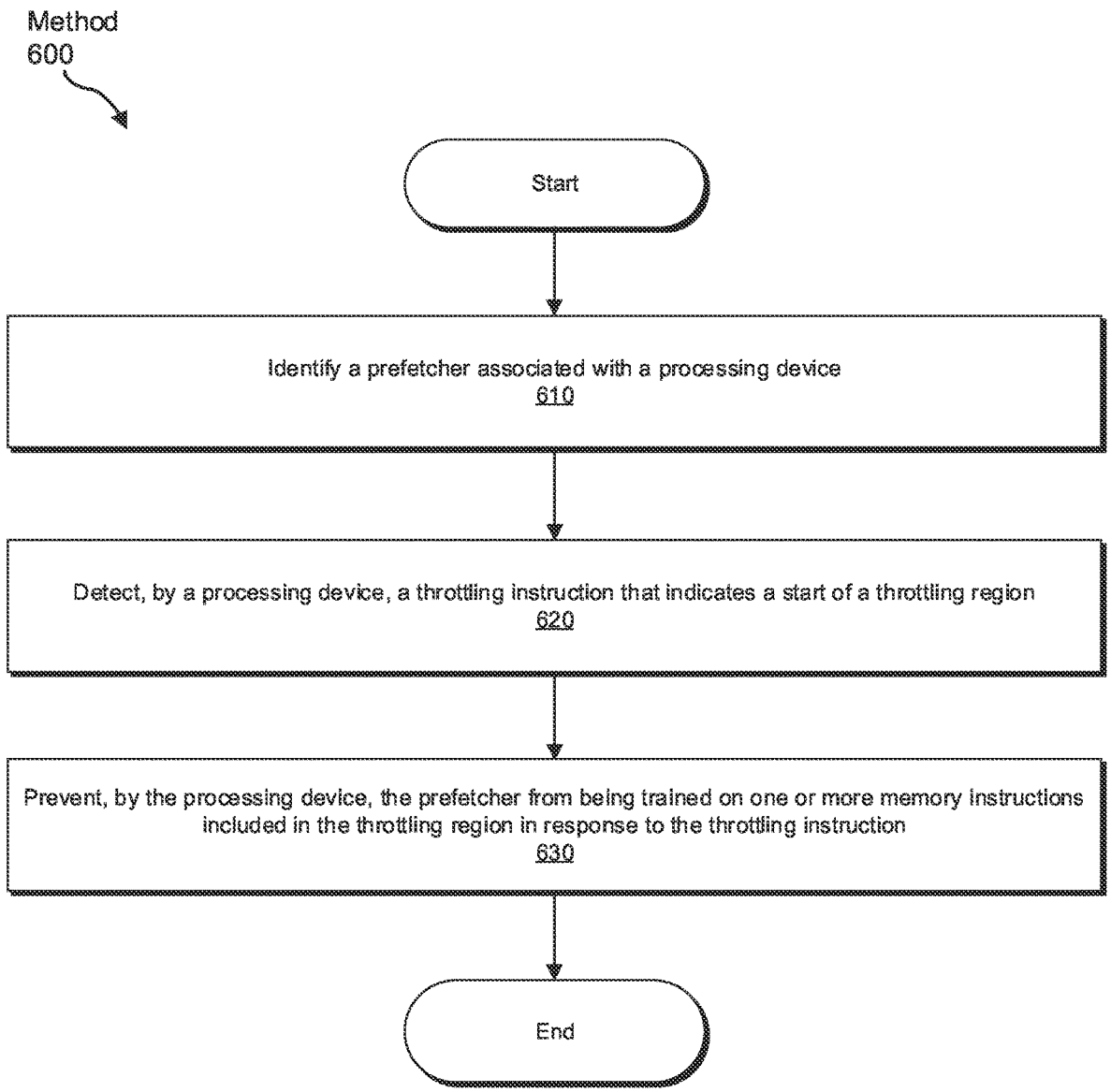
FIG. 6 is a flowchart of an exemplary method for throttling prefetchers to prevent training on irregular memory accesses according to one or more implementations of this disclosure.

FIG. 6 is a flow diagram of an exemplary method 600 for throttling prefetchers to prevent training on irregular memory accesses. In one example, the steps shown in FIG. 6 can be performed by one or more components of a processor incorporated into a computing device. Additionally or alternatively, the steps shown in FIG. 6 can also incorporate and/or involve various sub-steps and/or variations consistent with the descriptions provided above in connection with FIGS. 1-5.

As illustrated in FIG. 6, exemplary method 600 include and/or involve the step of identifying a prefetcher associated with a processing device (610). Step 610 can be performed in a variety of ways, including any of those described above in connection with FIGS. 1-5. For example, a processing device can identify a trainable prefetcher responsible for prefetching data from main memory to cache.

Exemplary method 600 also includes the step of detecting a throttling instruction that indicates a start of a throttling region (620). Step 620 can be performed in a variety of ways, including any of those described above in connection with FIGS. 1-5. For example, the processing device can detect a throttling instruction that indicates the start of a throttling region within executable code.

Exemplary method 600 further includes the step of preventing the prefetcher from being trained on one or more memory instructions included in the throttling region in response to the throttling instruction (630). Step 630 can be performed in a variety of ways, including any of those described above in connection with FIGS. 1-5. For example, the processing device can prevent the prefetcher from being trained on one or more memory instructions included in the throttling region in response to the throttling instruction.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality. Furthermore, the various steps, events, and/or features performed by such components should be considered exemplary in nature since many alternatives and/or variations can be implemented to achieve the same functionality within the scope of this disclosure.

The apparatuses, systems, and methods described herein can employ any number of software, firmware, and/or hardware configurations. For example, one or more of the exemplary implementations disclosed herein can be encoded as a computer program (also referred to as computer software, software applications, computer-readable instructions, and/or computer control logic) on a computer-readable medium. In one example, when executed by at least one processor, the encodings of the computer-readable medium cause the processor to generate and/or produce a computer-readable representation of an integrated circuit configured to do, perform, and/or execute any of the tasks, features, and/or actions described herein in connection with FIGS. 1-6. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and/or other distribution systems.

In addition, one or more of the modules, instructions, and/or micro-operations described herein can transform data, physical devices, and/or representations of physical devices from one form to another. Additionally or alternatively, one or more of the modules, instructions, and/or micro-operations described herein can transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the instant disclosure. The implementations disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including"

and "having" (and their derivatives), as used in the specification and claims, are interchangeable with and have the same meaning as the word "comprising."

What is claimed is:

1. A computing device comprising:
   at least one prefetcher; and
   a processing device communicatively coupled to the prefetcher, wherein the processing device is configured to:
   execute a sequence of executable code;
   detect a computer-readable throttling instruction that is included in the executable code and indicates a start of a throttling region of the executable code; and
   in response to the computer-readable throttling instruction, prevent the prefetcher from being trained on one or more memory instructions included in the throttling region.

2. The computing device of claim 1, wherein the processing device is further configured to:
   detect a training instruction that indicates an end of the throttling region; and
   in response to the training instruction, enable the prefetcher to be trained on one or more additional memory instructions that are included outside the throttling region.

3. The computing device of claim 2, wherein the prefetcher is configured to be trained on the additional memory instructions due at least in part to the additional memory instructions being included outside the throttling region.

4. The computing device of claim 1, wherein the prefetcher is configured to:
   perform one or more prefetches on data while the processing device executes the memory instructions included in the throttling region; and
   refrain from training on the memory instructions included in the throttling region.

5. The computing device of claim 1, wherein the processing device comprises at least one hardware signal and is configured to program the hardware signal to a state that prevents the prefetcher from being trained on the memory instructions in response to the computer-readable throttling instruction.

6. The computing device of claim 5, wherein the processing device comprises a core that:
   tags, due at least in part to the state of the hardware signal, the memory instructions with metadata indicating that the memory instructions are included in the throttling region; and
   upon tagging the memory instructions, dispatches the memory instructions in program order to a pipeline that implements out-of-order execution.

7. The computing device of claim 1, wherein the processing device:
   comprises a plurality of threads for multithreading;
   comprises a plurality of hardware signals that are mapped to the plurality of threads; and
   is configured to:
   identify a thread included in the plurality of threads that corresponds to the computer-readable throttling instruction; and
   selectively program a hardware signal included in the plurality of hardware signals to a state that prevents the prefetcher from being trained on the memory instructions due at least in part to the hardware signal being mapped to the thread corresponding to the computer-readable throttling instruction.

8. The computing device of claim 7, wherein the prefetcher is configured to be trained on additional memory instructions associated with at least one additional thread included in the plurality of threads despite the computer-readable throttling instruction.

9. The computing device of claim 1, wherein the processing device is further configured to:
   identify metadata associated with the memory instructions; and
   prevent the prefetcher from being trained on the memory instructions included in the throttling region due at least in part to the metadata indicating that the memory instructions are included in the throttling region.

10. The computing device of claim 9, wherein the processing device:
    comprises a pipeline that implements out-of-order execution; and
    is further configured to:
    enable the prefetcher to be trained on one or more additional memory instructions that are included outside the throttling region in response to detecting a training instruction that indicates an end of the throttling region; and
    after enabling the prefetcher to be trained on the additional memory instructions, preventing the prefetcher from being trained on the memory instructions due at least in part to the pipeline implementing the out-of-order execution and the metadata indicating that the memory instructions are included in the throttling region.

11. The computing device of claim 1, wherein the processing device is further configured to enable the prefetcher to be trained on one or more additional memory instructions in response to a context switch in which an operating system running on the processing device switches from a thread associated with the memory instructions to an additional thread associated with the additional memory instructions.

12. The computing device of claim 11, wherein the processing device is further configured to prevent the prefetcher from being trained on the memory instructions in response to an additional context switch in which the operating system reverts from the additional thread to the thread.

13. The computing device of claim 1, wherein the processing device is further configured to:
    detect, in an execution path, a deviation from the throttling region to a service handler; and
    enable the prefetcher to be trained on one or more additional memory instructions associated with the service handler despite the computer-readable throttling instruction due at least in part to the deviation to the service handler.

14. The computing device of claim 13, wherein the processing device is further configured to:
    detect, in the execution path, a return from the service handler to the throttling region; and
    prevent the prefetcher from being trained on the memory instructions due at least in part to the return to the throttling region.

15. The computing device of claim 1, further comprising a plurality of storage devices; and
    wherein the prefetcher comprises a plurality of prefetchers incorporated into the plurality of storage devices.

16. The computing device of claim 15, wherein the processing device is configured to:

identify a prefetcher included in the plurality of prefetchers that corresponds to the computer-readable throttling instruction; and selectively prevent the prefetcher that corresponds to the computer-readable throttling instruction from being trained on the memory instructions that are included in the throttling region.

17. The computing device of claim 16, wherein at least one additional prefetcher included in the plurality of prefetchers is configured to be trained on executable code external to the throttling region despite the computer-readable throttling instruction.

18. A method comprising:
identifying a prefetcher associated with a processing device;

executing, by the processing device, a sequence of executable code;

detecting, by the processing device, a computer-readable throttling instruction that is included in the executable code and indicates a start of a throttling region of the executable code; and preventing, by the processing device, the prefetcher from being trained on one or more memory instructions included in the throttling region in response to the computer-readable throttling instruction.

19. The method of claim 18, further comprising:
detecting a training instruction that indicates an end of the throttling region; and enabling the prefetcher to be trained on one or more additional memory instructions that are included outside the throttling region in response to the training instruction.

20. A circuit comprising:
a storage device with at least one prefetcher; and a processing device communicatively coupled to the storage device, wherein the processing device is configured to:

execute a sequence of executable code;

detect a computer-readable throttling instruction that is included in the executable code and indicates a start of a throttling region of the executable code; and in response to the computer-readable throttling instruction, prevent the prefetcher from being trained on one or more memory instructions included in the throttling region.

\* \* \* \* \*